UNITED STATES PATENT OFFICE.

JOHN F. PAINE, OF PROVIDENCE, RHODE ISLAND, ASSIGNOR, BY MESNE ASSIGNMENTS, OF ONE-HALF HIS RIGHT TO ROBERT MORROW, OF SAME PLACE.

IMPROVEMENT IN SHOE-NAILS.

Specification forming part of Letters Patent No. 139,327, dated May 27, 1873; application filed September 28, 1872.

*To all whom it may concern:*

Be it known that I, JOHN F. PAINE, of Providence, in the county of Providence and State of Rhode Island, have invented a new and Improved Shoe-Nail, of which the following is a specification:

My invention consists of carbonized-iron shoe-nails as a new article of manufacture, to be used as a substitute for steel nails heretofore used, being equally as serviceable and considerably cheaper in consequence of being made—that is, cut or shaped while in the condition of iron, which can be worked much cheaper than steel, which has to be cut and worked to form the steel nails, and requires more powerful machines than the iron does. After the cutting and shaping of the nails they are converted or carbonized by the following process:

First, a layer of bone-dust or ground bone is placed in the bottom of a cast-iron pot; then a layer of the iron nails to be converted is placed on the bone-dust; then another layer of nails is put in, and then another layer of bone-dust; and so on till the pot is filled, the topmost layer being bone-dust; the pot is then securely covered. Second, a number of pots so filled are packed in a furnace with charcoal, and subjected to the heat of the furnace, the charcoal being burned, beginning at the top and burning downward to equalize the heat, great care being taken to heat all the pots alike, to have the nails uniform in quality. They are also to be brought with great care to the requisite degree of heat to produce the requisite hardness, which will be determined by practical tests; and third, the nails are, on attaining the requisite degree of heat, instantly dumped into cold water to be chilled and hardened.

Having thus described my invention, I claim as new and desire to secure by Letters Patent—

As a new article of manufacture, carbonized shoe-nails, formed of iron and hardened or steelified, substantially as specified.

JOHN F. PAINE.

Witnesses:
JOHN C. PURKIS,
CHARLES SELDEN.